United States Patent [19]

Erich, Jr.

[11] Patent Number: 5,007,031
[45] Date of Patent: Apr. 9, 1991

[54] APPARATUS FOR POSITIONING GEOPHONES IN SHALLOW HOLES

[75] Inventor: Otis G. Erich, Jr., Norwalk, Calif.

[73] Assignee: Union Oil Company of California, Los Angeles, Calif.

[21] Appl. No.: 292,388

[22] Filed: Dec. 30, 1988

[51] Int. Cl.⁵ .............................................. H04R 1/00
[52] U.S. Cl. ................................... 367/178; 367/188; 367/191; 181/0.5
[58] Field of Search ...................... 367/191, 188, 178; 181/0.5; 439/624

[56] References Cited

U.S. PATENT DOCUMENTS

| | | | |
|---|---|---|---|
| 3,286,783 | 11/1966 | Cherry, Jr. et al. | 181/15.5 |
| 3,302,164 | 1/1967 | Waters et al. | 340/15.5 |
| 3,736,556 | 5/1973 | Barr, Jr. | 340/15.5 |
| 3,931,453 | 1/1976 | Hall, Jr. | 174/65 R |
| 4,059,820 | 11/1977 | Turpening | 340/15.5 |
| 4,300,220 | 11/1981 | Goff et al. | 367/188 |
| 4,470,134 | 9/1984 | McNeel | 367/188 |
| 4,838,379 | 6/1989 | Maxwell | 181/122 |

Primary Examiner—Charles T. Jordan
Assistant Examiner—J. Woodrow Eldred
Attorney, Agent, or Firm—Gregory F. Wirzbicki; Michael A. Kondzella

[57] ABSTRACT

A geophone and a geophone planting tool adapted to engage the outer case of the geophone, to hold it securely during aligning, leveling and implanting into the earth and to release it upon lifting the geophone planting tool from the geophone have matable surfaces which enable forces to be transmitted from the geophone planting tool to the geophone.

16 Claims, 1 Drawing Sheet

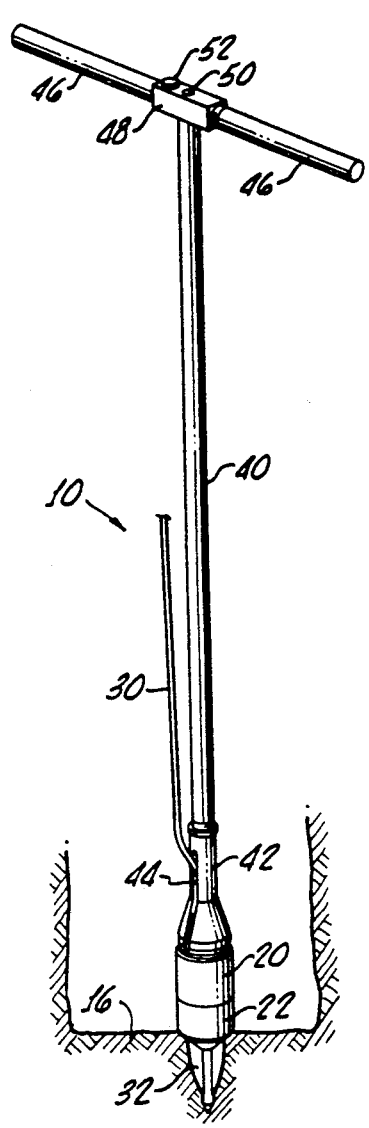
FIG. 1.
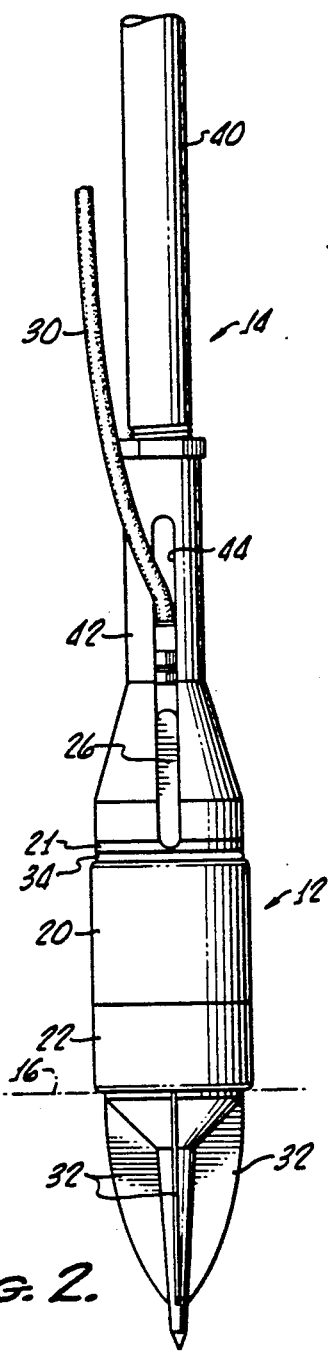
FIG. 2.
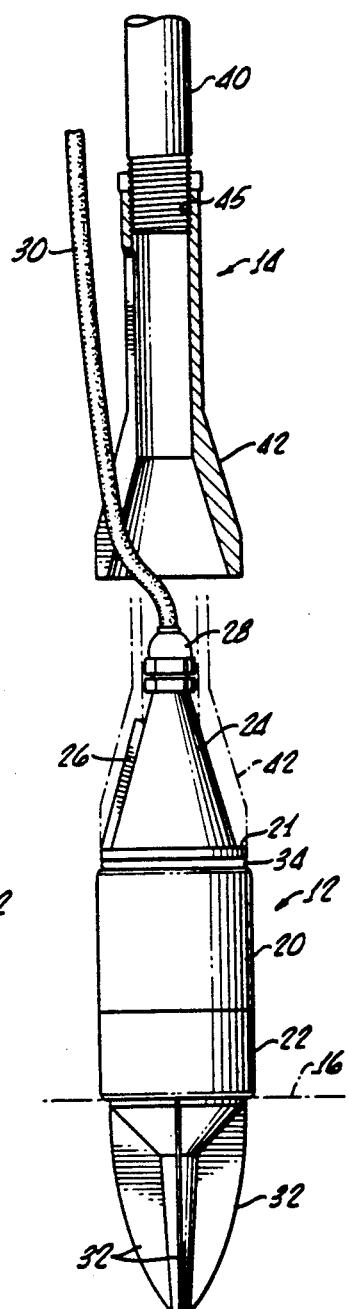
FIG. 3.
FIG. 4.
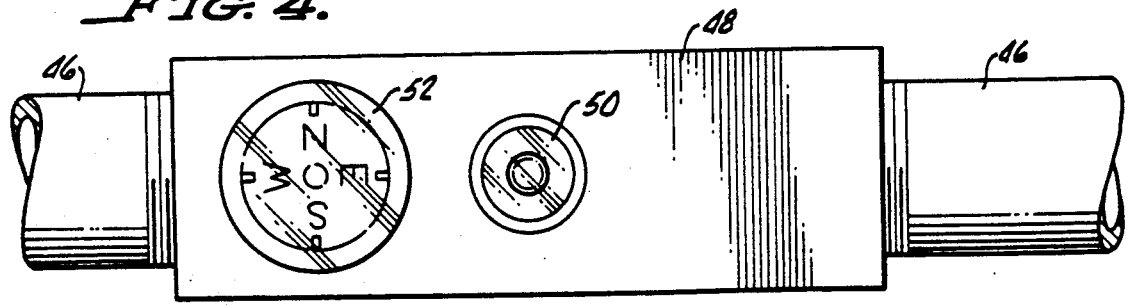

APPARATUS FOR POSITIONING GEOPHONES IN SHALLOW HOLES

BACKGROUND

1. Field of the Invention

This invention relates to apparatus for the detection of seismic waves using geophones. In one of its more particular aspects this invention relates to a device for positioning geophones in shallow holes.

2. Introduction

In the search for petroleum and other valuable resources, it has become the practice to transmit a seismic signal into the earth from one or more source points near the surface of the earth. The reflected and/or refracted energy returning from within the earth to a receiver location is detected by a geophone or other seismometer and raw seismic data are recorded. The raw seismic data are mathematically processed and then interpreted to provide an indication of the structure of the underlying strata.

Geophones that detect the reflected seismic signals are generally electromagnetic devices that contain at least one coil representing the electric circuit and at least one magnet which cooperates with the coil. Either the coil or the magnet is rigidly connected to a frame, while the other is elastically suspended from the frame. In response to earth motion, all of the fixed elements of the geophone move with the frame, but the suspended element, under the influence of inertia, tends to be delayed with respect to the unsuspended element, creating relative movement between the coil and magnet. This movement induces an electrical current in the coil which comprises the output signal of the geophone. In any of these geophones, there exists a primary axis, such as a horizontal axis or a vertical axis, along which the suspended element is free to reciprocate, thereby giving rise to the electrical output signal.

Geophones have been used to detect different types of generated seismic signals during seismic exploration of earth strata. The most common type is the so-called compressional (P) wave in which the earth particle motion is in the same direction as the wave propagation. Compressional waves are also sometimes called longitudinal waves. Another type is the shear wave in which the earth particle motion is normal to the direction of wave propagation. Shear waves in which the particle motion is oriented normal to the incident plane are called horizontal shear (SH) waves and shear waves in which the particle motion is oriented within the incident plane are called vertical shear (SV) waves.

Compressional waves are the signals most commonly used for seismic exploration. Compressional waves may be generated in numerous ways, such as the detonation of an explosive, the dropping of weights or the use of mechanical vibrators, and compressional waves are usually detected by so-called vertical geophones designed and manufactured with a vertical primary axis for detecting vertical earth movement. Recently, however, there has been an increased interest in the use of shear waves in seismic exploration. Cherry U.S. Pat. No. 3,286,783, Water U.S. Pat. No. 3,202,164, Barr, Jr. U.S. Pat. No. 3,736,556, and Turpening U.S. Pat. No. 4,059,820 disclose various apparatus and methods for the generation, detection, and use of shear waves in seismic exploration. Horizontal shear waves have generally been detected using horizontal geophones.

It has been proposed to use a combination of a vertical geophone and one or more horizontal geophones mounted on a common baseplate, known as a three-component geophone. Such combination is disclosed in Goff U.S. Pat. No. 4,300,220.

The positioning of geophones on the surface of the earth presents no particular problems, since it is a relatively simple task to adjust the level and alignment of surface employed geophones. However, the use of geophones in shallow holes, that is, holes of up to about 4 to 5 feet in depth, requires that the leveling and aligning be accomplished at the same time the geophone is placed in the hole, since subsequent repositioning is cumbersome and time consuming.

SUMMARY OF THE INVENTION

One of the advantages of the present invention is that positioning and planting of geophones in shallow holes is facilitated by means of an apparatus which enables the user to place the geophone at the bottom of the hole in the approximate position desired and to reposition the geophone from the surface of the earth until the precise level and alignment desired is obtained.

The invention provides the combination of a geophone and a geophone planting tool adapted to engage the outer case of the geophone and to hold it securely during leveling and aligning operations and to be readily releasable from the geophone upon completion thereof. The planting tool, in addition to holding the geophone prior to implantation in the earth, furnishes an outlet for an electrical conductor connected to the geophone, such that the conductor extends from the geophone to a point above the surface of the earth when the geophone and geophone planting tool are engaged. The engagement of the geophone and geophone planting tool is effective to permit the application of vertical pressure to the geophone for implanting the geophone in the earth at the bottom of the hole and to permit the rotation of the geophone to the desired alignment and to permit leveling of the geophone.

In a preferred embodiment of the invention the geophone planting tool comprises a cylindrical shaft, the lower hollow portion of which tapers outwardly, a slot extending from the bottom of the lower hollow portion to a sufficient distance above the tapered portion of said shaft to provide an outlet for an electrical conductor connected to a geophone engaged by the planting tool. On the outside of the geophone case, which tapers inwardly from a flange normal to the axis of the geophone to a connection to an electrical conductor at one end of the geophone, is positioned a key adapted to fit securely within the slot in the tapered portion of the geophone planting tool. The bottom of the planting tool has a flat edge adapted to engage the flange on the geophone case. The bottom of the geophone, that is, the end opposite from the tapered end, is equipped with a spike for anchoring the geophone in the earth.

In a more preferred embodiment, the geophone spike is a multi-bladed spike, especially one having three or four blades normal to the axis of the geophone.

In another more preferred embodiment, the geophone planting tool is equipped with a handle having a flat portion normal to the axis of the cylindrical shaft, which flat portion is equipped with one or both of a level indicating means and an aligning means.

BRIEF DESCRIPTION OF THE DRAWINGS

The invention will be more readily understood by reference to the accompanying drawings, wherein like numerals refer to like elements, and in which:

FIG. 1 is a perspective view of a geophone positioning and planting apparatus of the invention, showing the geophone implanted in the earth at the bottom of a shallow hole.

FIG. 2 is a vertical elevation of the bottom portion of the geophone positioning and planting apparatus of the invention, enlarged over the scale of FIG. 1, showing the geophone and geophone planting tool engaged.

FIG. 3 is an exploded vertical elevation similar to FIG. 2, partly in cross-section, but showing the geophone and geophone planting tool disengaged and rotated 90° clockwise from the position shown in FIG. 2.

FIG. 4 is a plan view of a portion of the handle of the geophone planting tool shown in FIG. 1.

DESCRIPTION OF THE PREFERRED EMBODIMENTS

Referring to FIG. 1, which depicts the geophone positioning and planting apparatus of this invention in use, the numeral 10 represents the geophone positioning and planting apparatus consisting of a geophone 12 and a geophone planting tool 14. Apparatus 10 is shown with the end of geophone 12 implanted in earth 16, which may be at the bottom of a shallow hole. Geophone 12, best shown in FIG. 3, includes (1) a cylindrical casing 20 equipped with a flange 21, which is normal to the axis of geophone 12, (2) a cap (or cover) 22 which slips over casing 20, thus closing it, (3) a conical closure 24 having on its surface a key 26, (4) a connector 28 through which projects an electrical conductor 30, and (5) a multi-pronged spike 32 attached to cap 22. An o-ring 34 separates conical fitting 24 from casing 20 and provides a tight fit between them. Geophone planting tool 14 includes a cylindrical shaft 40, at one end of which a slotted fitting 42 having a slot 44 (FIG. 1 and FIG. 2) is attached by means of threads 45 (FIG. 3). The lower part of slotted fitting 42 is in the shape of an inverted cone. At the other end of cylindrical shaft 40 is attached a handle 46 (FIG. 1 and FIG. 4). The middle part of handle 46 includes an enlarged flattened portion 48, on the surface of which are located a level indicator 50 and a compass 52.

In use, an operator inserts geophone 12 into slotted fitting 42 of geophone planting tool 14 so that key 26 of conical closure 24 of geophone 12 fits into slot 44 of slotted fitting 42 and electrical conductor 30 extends through slot 44 to the exterior of slotted fitting 42. Then, holding electrical cable 30 in one hand and geophone planting tool 14 in the other hand, the operator lowers geophone positioning and planting apparatus 10 into the hole in which it is to be planted. By rotating handle 46 of geophone planting tool 14 until the desired reading on compass 52 is obtained and rocking the geophone planting tool until level indicator 50 indicates that the top of the geophone planting tool and therefore flange 21 of geophone 12 is level, the operator aligns and levels geophone 12. Then, pushing down on handle 46, the operator anchors geophone 12 firmly in the earth by implanting multi-pronged spike 32 into the earth. Finally, the operator lifts the geophone planting tool from the hole, leaving the geophone at the bottom of the hole properly aligned and leveled and coupled securely to the earth.

The apparatus of this invention is particularly useful with three-component geophones, although it can be used with other types of geophones as well. Three-component geophones suitable for use in the apparatus of this invention include commercially available geophone elements, such as used in the PE-6 geophone marketed by Sensor Division of Geosource Corporation of Houston, Tex.

Materials of construction are not critical. The multi-pronged spike 32 is preferably fabricated of steel or stainless steel. The geophone planting tool can be fabricated of any desired metal. However, if a compass is included in the handle of the planting tool, the planting tool should be fabricated of a non-magnetic metal such as non-magnetic stainless steel or a nonferrous metal such as aluminum or brass.

While particular embodiments of the invention have been described, it will be understood, of course, that the invention is not limited thereto, since many obvious modifications can be made and it is intended to include any such modifications as will fall within the scope of the appended claims.

What is claimed is:

1. An apparatus for positioning geophones in shallow holes in the earth comprising a geophone and a geophone planting tool engageable with said geophone to implant said geophone in the earth at the bottom of a shallow hole and to level and align said geophone in said shallow hole, said geophone having an electrical conductor connected thereto, said geophone planting tool being adapted to be engaged with said geophone and held in engagement therewith during implanting, leveling and aligning thereof by pressure on said conductor and to be disengaged from said geophone after aligning, leveling and implanting said geophone by release of pressure on said conductor.

2. An apparatus for positioning geophones in shallow holes in the earth comprising:
   a geophone and
   a geophone planting tool; said geophone comprising:
   a casing;
   a closure tapering inwardly away from said casing connected at one end of said casing, said closure containing a flange normal to the axis of said geophone at its end connected to said casing, and a key on the tapering surface thereof; and
   a spike connected at the other end of said casing;
   said geophone planting tool comprising:
   a shaft containing a cylindrical portion at one end thereof and an outwardly tapering hollow portion at the other end, said hollow portion being matable with said inwardly tapering closure, and having a slot engageable with said key; and
   a handle normal to said shaft at the end containing the cylindrical portion.

3. An apparatus according to claim 2 wherein said closure is separated from said casing by an o-ring.

4. An apparatus according to claim 2 wherein said closure is substantially in the form of a cone.

5. An apparatus according to claim 2 wherein said spike is multi-bladed.

6. An apparatus according to claim 2 wherein said spike contains three blades normal to the axis of said geophone.

7. An apparatus according to claim 2 wherein said spike contains four blades normal to the axis of said geophone.

8. An apparatus according to claim 2 wherein said casing is fitted with a cover to which said spike is attached.

9. An apparatus according to claim 2 wherein said outwardly tapering hollow portion and said slot are contained in a slotted fitting threadedly connected to said shaft.

10. An apparatus according to claim 2 wherein at least the middle portion of said handle is flattened.

11. An apparatus according to claim 2 wherein said handle contains an enlarged flattened portion at the middle of said handle.

12. An apparatus according to claim 2 wherein said handle contains a level indicator.

13. An apparatus according to claim 2 wherein said handle contains a compass.

14. An apparatus according to claim 2 wherein said handle contains both a level indicator and a compass.

15. An apparatus according to claim 2 wherein said geophone additionally comprises an electrical conductor connected thereto and said slot provides an outlet for said electrical conductor.

16. A method for aligning, leveling and coupling geophones comprising:
   inserting a geophone having an outwardly tapering surface with a key affixed thereto and an attached electrical conductor into a hollow, inwardly tapering end of a geophone planting tool, said end having a slot adapted to engage said key and to provide an outlet for said conductor, so that said conductor extends exteriorly of said geophone planting tool and said key is engaged by said slot;
   lowering said geophone planting tool into a hole in the earth in which said geophone is to be planted while holding said conductor to retain said geophone within said geophone planting tool;
   rotating said geophone planting tool to obtain the desired alignment of said geophone;
   rocking said geophone planting tool to level said geophone; and
   pushing down on said geophone planting tool to couple said geophone to the earth in the bottom of said hole.

* * * * *